United States Patent [19]

Coran et al.

[11] 4,410,656

[45] Oct. 18, 1983

[54] METHOD FOR RUBBER TREATMENT

[75] Inventors: Aubert Y. Coran; Charles P. Rader; Chester D. Trivette, Jr., all of Akron, Ohio

[73] Assignee: Monsanto Company, St. Louis, Mo.

[21] Appl. No.: 374,451

[22] Filed: May 3, 1982

[51] Int. Cl.$^3$ ............................ C08J 3/20; C08L 7/00; C08L 9/00; C08L 9/06
[52] U.S. Cl. .................................... 524/529; 524/531; 525/256; 525/261; 525/285; 525/301
[58] Field of Search .............. 525/261, 244, 285, 256, 525/301; 524/532, 529, 531

[56] References Cited

U.S. PATENT DOCUMENTS

| 2,388,905 | 11/1945 | Compagnon et al. | 260/768 |
|---|---|---|---|
| 4,080,493 | 3/1978 | Yasui et al. | 526/192 |
| 4,082,817 | 4/1978 | Imaizumi et al. | 525/244 |
| 4,254,013 | 3/1981 | Friedman et al. | 525/218 |

FOREIGN PATENT DOCUMENTS 952021 3/1964 United Kingdom .

OTHER PUBLICATIONS

Le Bras et al., "The Chemistry of Rubber-The Interaction of Ethylenic Compounds and Rubber", Rubber Chem. & Tech. 20 938.
Le Bras et al., "Modification of Rubber by Reaction with Maleic Anhydride" Rubber Chem. & Tech. 31 664.
Pinazzi et al., "Addition of Unsaturated Monomers to Rubber and Similar Polymers" Rubber Chem. & Tech. 36 282.
Bacon et al., "The Interaction of Maleic Anhydride with Rubber" Rubber Chem. & Tech. 12 200.
Le Bras–"A New Material: Anhydride Rubber, I" Rubber Chem. & Tech. 19 313.
Compagnon et al., "Anhydride Rubber II Production and Vulcanization" Rubber Chem. & Tech. 19 319.

*Primary Examiner*—Allan Lieberman
*Attorney, Agent, or Firm*—Gordon B. Seward

[57] ABSTRACT

The method of masticating diene rubber in the presence of maleic acid or maleic anhydride together with sulfur or an organic sulfur compound capable of generating a thiyl radical is shown.

Improved tack, green strength or both are realized in the treated diene rubber.

39 Claims, No Drawings

METHOD FOR RUBBER TREATMENT

BACKGROUND OF THE INVENTION

This invention relates to a method for treating diene rubber with maleic acid or maleic anhydride together with sulfur or an organic sulfur compound capable of generating a thiyl radical. The method is effective in improving the tack, green strength or both of the diene rubber.

The introduction of synthetic diene rubber as a total or partial replacement for natural rubber in elements of pneumatic tires and other rubber articles presented problems in that the behavior of the synthetic materials differed from that of natural rubber. One significant area of difference concerned tack and green strength. Typically, unvulcanized synthetic diene rubber has significantly lower green strength and tack properties than does natural rubber. This difference has presented problems in that articles such as tires failed to maintain their structural integrity during handling and shaping prior to vulcanization. As a result, searching for improvements in the green strength and tack of rubber compounds containing synthetic rubber has been a continuing effort.

Synthetic polyisoprene has been produced which resembles natural rubber closely, consisting of essentially all cis-1,4-polyisoprene. Perhaps the most significant difference between synthetic polyisoprene and natural rubber is that the former has considerably less green strength and tack. Thus, much of the effort toward green strength and tack improvement concerns synthetic polyisoprene. Other synthetic diene rubbers which are widely used are polybutadiene and styrene/butadiene copolymer rubber (SBR).

Efforts to increase the tack and green strength of diene rubber include a variety of treatments such as the addition of a wide variety of resin tackifiers to synthetic rubber compounds. In general, these materials have been ineffective for the desired purpose, primarily because of the inherently lower green strength of the synthetic rubber polymers. U.S. Pat. Nos. 3,151,161 and 3,225,100 teach incorporation of nitrosoanilinoalkanes into rubber, and improvements in green strength have been realized in synthetic rubber thus treated. Problems of dispersion of these materials into rubber have been encountered, compounded by the fact that relatively small amounts are generally used.

A number of investigators have studied the reaction of maleic anhydride with unsaturated elastomers. Their studies differ from the instant invention in that some were performed in solvent solution, requiring recovery of the treated rubber before it could be used. Some studies employed peroxides, which are undesirable, being difficult to handle. Other studies employed excessive times and/or temperatures, or used high levels of maleic anhydride, all of which contributed to production of stiff, resinous product, unacceptable for use in rubber formulations. An overall problem has been to obtain higher green strength without significant crosslinking which would reduce tack. Practice of the instant invention can give both green strength and tack improvement.

SUMMARY OF THE INVENTION

It is an object of this invention to provide a method of treating diene rubber so as to increase its green strength, tack or both. It is another object to provide a diene rubber composition by this method which has increased tack or green strength or both.

These and other objects are realized in the instant invention by a method of improving the properties of diene rubber comprising masticating solid diene rubber, in the presence of a modification promoting amount of (A) sulfur or an organic sulfur compound capable of generating thiyl radicals, with (B) maleic acid or anhydride at an appropriate temperature above 130° C. for a time sufficient to increase the green strength and/or tack of the diene rubber, but insufficient to decrease its tack.

Further, the invention includes the product of the above method.

Component (B) of the invention is maleic acid or maleic anhydride or combinations of the two.

Component (A) of the invention is defined as sulfur or an organic sulfur compound capable of generating of thiyl radical. The sulfur compound is preferably a polymeric sulfide or a compound of the formula $(R_1S_x)_yR_2$, wherein x is an integer of 1-5, y is an integer of from 1-4, $R_2$ is a radical selected from aliphatic hydrocarbon radicals of 3-18 carbon atoms optionally containing one or more ether or ester linkages and optionally substituted by one or more nitro, amino or carboxyl groups; cycloalkyl of 3-10 carbon atoms; benzyl or phenyl optionally ring-substituted by one or more nitro, amino, carboxyl, or 1-5 carbon-atom alkyl groups; or benzothiazyl; dialkylthiocarbamoyl; alkylamino of 4-12 carbon atoms; morpholino or dialkylthiophosphoryl; $R_2$ having a valence of y; and $R_1$ is hydrogen or a radical selected from the same group as $R_2$.

Such sulfur compounds include, for example, thiokol polymers and phenyl disulfide, 4,4'-diaminophenyldisulfide, 4,4'-dinitrophenyldisulfide, 2,2'-diaminophenyldisulfide, 4,4'-dicarboxyphenyldisulfide, cyclohexyldisulfide, benzyldisulfide, the compound n-$C_8H_{17}$-$S_x$-$C_8H_{17}$-n, where x is an average of 3.5; N,N'-dimorpholinodisulfide, N-t-butyl-2-benzothiazyl sulfenamide, tetramethyl thiuram disulfide; mercaptans, such as n-decyl mercaptan, n-dodecyl mercaptan, phenyl mercaptan and 2-mercaptobenzothiazole; and compounds of the formula Acc-SS-R-SS-Acc, where ACC stands for an accelerator moiety such as benzothiazyl, dialkyldithiocarbamoyl, and the like, and R is a divalent hydrocarbon radical such as alkylene, p-phenylene, p-xylene and the like.

Examples of this latter variety of compounds are

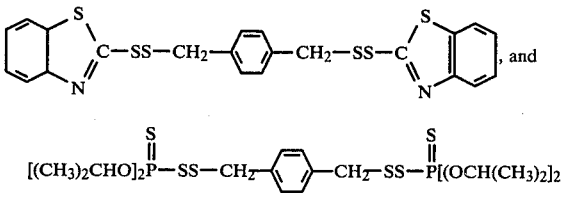

, and $[(CH_3)_2CHO]_2\overset{S}{\underset{\|}{P}}-SS-CH_2-\langle\rangle-CH_2-SS-\overset{S}{\underset{\|}{P}}[(OCH(CH_3)_2]_2$ A preferred embodiment of (A) within the general formula is 2,2'-dithiobisbenzothiazole, sometimes known as benzothiazyldisulfide, or MBTS.

If sulfur is used as component (A) it can generally be used in lesser amounts than the organic sulfur compounds. The use of too much sulfur may actually reduce tack since, with excessive amounts of sulfur, appreciable vulcanization may occur during the treatment.

By diene rubber is meant an elastomer which is a polymer from diene monomer, either a natural or synthetic polymer, including mixtures of two or more of natural and synthetic polymers. Natural diene rubber includes Hevea rubber, in the form of smoked sheet, crepe or other typical forms, guayule, and other naturally occurring elastomers. Synthetic polymers which are included in the definition of "diene rubber" include polymers from isoprene and butadiene, either homopolymer or copolymers with one or more co-monomers, which can be dienes or other polymerizable materials. For examples, copolymers of isoprene or butadiene with styrene, acrylonitrile, isobutylene, or unsaturated carboxy acids and esters such as maleic, fumaric, itaconic, acrylic and methacrylic acids, and methylmethacrylate are included. EPDM rubbers (polymers from ethylene, propylene and a non-conjugated diene monomer) are also included.

The invention finds a particular utility in use with synthetic polyisoprene of a high cis-1,4 content, and with blends thereof with polybutadiene or SBR (styrene/butadiene copolymer rubber).

Component (A) is to be used in reaction promoting amount. This amount can vary, depending on the diene rubber, the particular component (B) employed, the improvement desired and, especially, the nature of the particular component (A) used. In general, the amount is preferably from 0.01 to 15 parts, more preferably from 0.02 to 4 parts and most preferably from 0.05 to 2.5 parts by weight of component (A) per 100 parts by weight of diene rubber. If (A) is sulfur, less than 0.25 parts per 100 parts of treated rubber is preferred.

Component (B) can similarly be present in varying amount, but is preferably used at level of from 0.1 to 20 parts, more preferably from 0.2 to 8 parts and most preferably from 0.25 to 5 parts by weight per 100 parts by weight of diene rubber. The use of amounts of either components (A) or (B) which are less than the preferred lower limits can result in insufficient improvement in the desired properties of the diene rubber. Also, the use of amounts of the components in excess of the preferred upper limits can be counter-productive. Optimum levels can be easily determined by a few simple experiments, and will, of course, depend also on time and temperature.

Masticating the diene rubber means mixing it with high shear in the presence of components (A) and (B) at the appropriate temperature above 130° C. for sufficient time to permit modification to occur. Preferably, the temperature should be at least 150° C., more preferably above 160° and most preferably from 160° to 210° C. A convenient method of masticating involves admixture of components (A) and (B) into the rubber using the type of high-shear equipment normally used for mixing rubber compounds, such as rubber mills, and, preferably, internal mixers exemplified by Banbury mixers and the like. Such mixing produces a temperature rise in the rubber mixture which can be controlled within the desired temperature range.

Preferably, the mastication time will be from 0.1 to 20 minutes, more preferably from 0.5 to 15 minutes and most preferably from 1 to 10 minutes. Shorter mastication times than the preferred minimum can result in insufficient improvement in the desired properties, and longer times than the preferred maximum can be harmful to the rubber. It is preferred that the mastication time employed will result in increasing the tack of the rubber as well as the green strength. As with the levels of the components, both optimum times and optimum temperatures for a specific combination of ingredients can easily be determined by a limited number of experiments.

Other rubber compounding ingredients can optionally be present during the mastication, and the presence of carbon black and/or non-black fillers is preferred. Because of the conditions employed, however, the complete vulcanization system is preferably not present during the mastication, as it could result in a premature curing, or scorch, of the diene rubber compound. If it is desired to have non-black fillers present in the diene rubber compound, particular advantage is realized by having the fillers present during the mastication step. This method can produce interaction between the non-black filler and the diene rubber so as to obtain better physical properties in the vulcanized compounds. These better physical properties are evidenced in improvements in stress-strain properties among other properties.

Preferably, the presence of amines such as antidegradants, during the treatment step, should be avoided lest they react with component (B) before it can react with the rubber polymer. Such compounding ingredients and others which can react adversely with component (B) should be added after the treatment, either as a separate step or simply added after sufficient reaction time.

Often, when masticating the diene rubber, amounts of components (A) and (B) will be substantially less than the maximum preferred levels set forth above, such as, for example, less than three parts by weight per 100 parts of diene rubber by weight, but higher amounts can be employed, especially if a "masterbatch" technique is used. This technique can involve masticating only a portion of the diene rubber with both components present, then subsequently blending the remaining portion into the masticated portion. From ten parts or less up to 1,000 parts or more additional rubber can be admixed to the masticated rubber, as desired. The additional rubber can be the same as, or different from the rubber originally masticated. The masterbatch technique can be effective in providing more efficient use of the masticating equipment, thus allowing higher throughout of rubber.

During the mastication step, the appropriate amounts of components (A) and (B) are both present in the diene rubber. They can be added separately, or both components can be added together as a mixture.

As mentioned above, increasing the tack and green strength of diene rubber is of great practical importance. The nature of these two properties in uncured rubber compounds has been explored by a number of investigators. A review of recent developments was recently published, written by G. R. Hamed of the University of Akron, entitled "Tack and Green Strength of Elastomeric Materials", *Rubber Chemistry and Technology*, 54, pp. 576-595 (1981). This review brings out the basic fact that tack and green strength are interrelated. Tack has been defined as the ability of two materials to resist separation after bringing their surfaces into contact for a short time under a light pressure. Green strength in an elastomer is its resistance, before vulcanization, to deformation or fracture. Green strength can be determined independently, but tack is dependent to a certain degree on green strength.

DETAILED DESCRIPTION

A more complete understanding of the invention may be realized by reference to the following examples, in which all parts are by weight, unless otherwise specified.

Components (A) and (B) are admixed to diene rubber with mastication, and the compounds thus formed are tested, in the uncured state, for tack and green strength.

Green strength measurements are performed using a standard tensile testing machine. Samples of the stock to be tested are pressed into slabs approximately three millimeters in thickness, from which slab specimens are die-cut measuring about 20.3×2.4 cm. The specimens are bench marked (to a test length of 2.54 cm.) in the center, and the exact width and thickness is measured. Specimens are pulled at a crosshead speed of 50.8 cm. per minute, with the stress recorded at desired levels of elongation up to 1200%, or break. Stress values are calculated based on the original cross-section area of each specimen, and the maximum stress value is also recorded.

Tack measurements are made using the Monsanto Tel-Tak instrument, as described in an article by J. R. Beatty in *Rubber Chemistry and Technology*, 42, 1040 (1969). Fabric-backed rubber specimens are cut to a width of 6.36 mm and placed at right angles to give a contact area of 0.403 cm². A contact pressure of 227 grams is used for all tests, with a 30-second dwell time. Sample "stickiness" is measured by substituting a polished stainless steel surface for one specimen, and the result is subtracted from the tack value to give a "true tack" measurement. The units of these measurements are in grams per square centimeter, representing the maximum force per unit area required to separate the specimens, at a separation rate of 2.54 cm. per minute.

Stress-strain properties of the vulcanizates are measured in the conventional manner, using the procedures outlined in ASTM D-412.

In all of the following examples, the masterbatch is mixed in a laboratory Banbury mixer according to the following schedule:

1. Charge rubber and test compounds; mix 1 minute, controlling temperature between 150° and 154° C.
2. Charge ½ of carbon black; mix 1 minute.
3. Charge oil and remainder of carbon black; mix 1 minute.
4. Charge remaining ingredients; mix 1 minute.
5. Sweep down; mix 1 minute.
6. Dump. Actual rubber temperature (using a needle thermocouple) should be 170°–200° C.

If sulfur and accelerator are included, they are then admixed on a laboratory mill.

EXAMPLE I

To evaluate the effect of maleic acid and maleic anhydride on synthetic polyisoprene, with and without a thiyl radical source, a series of compounds is mixed. A control with natural rubber (SMR 5 CV) is included as well as a compound containing a known treating agent, NITROL ®, which is N-(2-methyl-2-nitropropyl)-4-nitrosoaniline (33% on a clay carrier), used at its recommended level.

Masterbatch formulations and test results are set forth in Table I. The antidegradant used is N-(1,3-dimethylbutyl)-N'-phenyl-p-phenylenediamine, sold by Monsanto under the trademark SANTOFLEX ® 13.

Comparison of the green strength and tack of masterbatches A and B shows the difference between natural rubber and synthetic polyisoprene in these important properties. The results for the remaining runs show varying degrees of improvement in the properties of the synthetic polyisoprene, some of which exceed those of natural rubber. Highest values are obtained for the combination of MBTS with maleic acid and maleic anhydride, with the latter being superior.

Each of the masterbatches A-G is then completely compounded by adding 2.0 parts of sulfur and 0.8 parts of accelerator (N-t-butyl-2-benzothiazolylsulfenamide) on a laboratory mill. Green strength and tack measurements are then made on the completed stock. Results are set forth in Table II.

TABLE I

| | MASTERBATCH | | | | | | |
|---|---|---|---|---|---|---|---|
| | A | B | C | D | E | F | G |
| Polymer | | | | | | | |
| SMR 5 CV | 100.0 | — | — | — | — | — | — |
| Natsyn 2200 | — | 100.0 | → | → | → | → | → |
| Test Compound | | | | | | | |
| NITROL ® | — | — | 1.0 | — | — | — | — |
| Maleic Acid | — | — | — | 1.0 | 1.0 | — | — |
| Maleic Anhydride | — | — | — | — | — | 1.0 | 1.0 |
| MBTS | — | — | — | — | 0.2 | — | 0.2 |
| Other Ingredients | | | | | | | |
| N-330 Carbon Black | 50.0 | → | → | → | → | → | → |
| Circosol 4240 Oil | 5.0 | → | → | → | → | → | → |
| Zinc Oxide | 5.0 | → | → | → | → | → | → |
| Stearic Acid | 2.0 | → | → | → | → | → | → |
| Antidegradant | 2.0 | → | → | → | → | → | → |
| Banbury Dump Temp. °C. | 200 | 193 | 199 | 202 | 201 | 199 | 203 |
| Green Strength | | | | | | | |
| 300% Modulus, MPa | 0.41 | 0.24 | 0.44 | 0.32 | 0.51 | 0.50 | 1.59 |
| Break, MPa | 1.41 | 0.27 | 1.00 | 0.70 | 1.27 | 1.28 | 1.86 |
| % Elongation | 620 | >1200 | 550 | 840 | 540 | 600 | 450 |
| Tack, Monsanto Tel-Tak | | | | | | | |
| Tack | 86.4 | 44.5 | 71.6 | 57.3 | 91.7 | 86.8 | 110.0 |
| Stickiness | 10.5 | 10.9 | 12.5 | 13.0 | 14.1 | 11.5 | 13.4 |
| "True Tack" | 75.9 | 33.6 | 59.1 | 44.3 | 77.6 | 75.3 | 96.6 |

TABLE II

| | STOCK | | | | | | |
|---|---|---|---|---|---|---|---|
| | 1 | 2 | 3 | 4 | 5 | 6 | 7 |
| Masterbatch | A 163.0 | — | — | — | — | — | — |

TABLE II-continued

|  |  | STOCK |  |  |  |  |  |  |
|---|---|---|---|---|---|---|---|---|
|  |  | 1 | 2 | 3 | 4 | 5 | 6 | 7 |
|  | B | — | 163.0 | — | — | — | — | — |
|  | C | — | — | 164.0 | — | — | — | — |
|  | D | — | — | — | 164.0 | — | — | — |
|  | E | — | — | — | — | 164.2 | — | — |
|  | F | — | — | — | — | — | 164.0 | — |
|  | G | — | — | — | — | — | — | 164.2 |
| Sulfur |  | 2.0 | → | → | → | → | → | → |
| Accelerator |  | 0.8 | → | → | → | → | → | → |
| Green Strength |  |  |  |  |  |  |  |  |
| 300% Modulus, MPa |  | 0.34 | 0.15 | 0.30 | 0.21 | 0.31 | 0.27 | 0.50 |
| Break, MPa |  | 0.93 | 0.12 | 0.66 | 0.27 | 0.99 | 0.86 | 1.58 |
| % Elongation |  | 670 | >1200 | 660 | >1200 | 730 | 920 | 570 |
| Tack, Monsanto Tel-Tak |  |  |  |  |  |  |  |  |
| Tack |  | 71.9 | 41.2 | 54.3 | 45.0 | 73.9 | 68.0 | 103.3 |
| Stickiness |  | 10.9 | 12.8 | 14.0 | 12.6 | 18.5 | 14.9 | 18.3 |
| "True Tack" |  | 61.0 | 28.4 | 40.3 | 32.4 | 55.4 | 54.9 | 85.0 |

TABLE III

|  | MASTERBATCH |  |  |  |  |
|---|---|---|---|---|---|
|  | H | I | J | K | L |
| Polymer |  |  |  |  |  |
| Natsyn 2200 Polyisoprene | 100.0 | → | → | → | → |
| Test Compounds |  |  |  |  |  |
| Fumaric Acid | 1.0 | 1.0 | — | — | — |
| Maleic Acid | — | — | 1.0 | 1.0 | 1.0 |
| MBTS | — | 0.2 | — | 0.1 | — |
| Sulfur | — | — | 0.2 | 0.1 | — |
| MBT | — | — | — | — | 0.2 |
| Other Ingredients |  |  |  |  |  |
| N-330 Carbon Black | 50.0 | → | → | → | → |
| Circosol 4240 Oil | 5.0 | → | → | → | → |
| Zinc Oxide | 5.0 | → | → | → | → |
| Stearic Acid | 1.0 | → | → | → | → |
| Antidegradant | 2.0 | → | → | → | → |
| Banbury Dump Temp. °C. | 202 | 204 | 200 | 204 | 202 |
| Green Strength |  |  |  |  |  |
| 300% Modulus, MPa | 0.19 | 0.19 | 0.52 | 0.38 | 0.38 |
| Break, MPa | 0.14 | 0.15 | 1.08 | 1.01 | 1.02 |
| % Elongation | >1200 | >1200 | 510 | 670 | 650 |
| Tack, Monsanto Tel-Tak |  |  |  |  |  |
| Tack | 39.3 | 33.5 | 46.8 | 72.2 | 90.7 |
| Stickiness | 15.5 | 12.8 | 10.8 | 15.8 | 12.0 |
| "True Tack" | 23.8 | 20.7 | 36.0 | 56.4 | 78.7 |

Both the green strength and the tack of the fully compounded stocks are lower than their corresponding masterbatches, but the same trends and ratios are generally present.

EXAMPLE II

Using the same procedures as in Example I, a series of masterbatches was prepared containing fumaric and maleic acids, and sulfur, MBTS and MBT. Green strength and tack results were obtained on the masterbatches, as set forth in Table III. Analysis of the data in Table III shows that fumaric acid was essentially ineffective in improving the green strength or tack of the masterbatch, either with or without MBTS. Maleic acid, however, improved the green strength and tack of the masterbatch when combined with MBTS, sulfur, MBT or a combination of sulfur and MBTS.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The method of improving the properties of diene rubber comprising masticating solid diene rubber, in the presence of a modification promoting amount of (A) sulfur or an organic sulfur compound capable of generating thiyl radicals, with (B) maleic acid or anhydride at an appropriate temperature above 130° C. for a time sufficient to increase the green strength or tack of the diene rubber but insufficient to decrease its tack, wherein the time is from 0.1 to 20 minutes and (A) and (B) are present in amounts of from 0.01–15 and 0.1–20 parts by weight, respectively, per 100 parts diene rubber by weight.

2. The method of claim 1 wherein the diene rubber is masticated for a time sufficient to increase both its green strength and its tack.

3. The method of claim 1 wherein the mastication temperature is at least 150° C.

4. The method of claim 3 wherein the diene rubber comprises polyisoprene.

5. The method of claim 4 wherein (A) is sulfur.

6. The method of claim 4 wherein (A) is an organic sulfur compound capable of generating thiyl radicals.

7. The method of claim 6 wherein (A) is selected from polymeric polysulfides and compounds of the formula $(R_1S_x)_yR_2$, wherein x is an integer of 1–5, y is an integer of from 1–4, $R_2$ is a radical selected from aliphatic hydrocarbon radicals of 3–18 carbon atoms optionally containing one or more ether or ester linkages and optionally substituted by one or more nitro, amino or carboxyl groups; cycloalkyl of 3–10 carbon atoms; benzyl or phenyl optionally ring-substituted by one or more nitro, amino, carboxyl, or 1–5 carbon-atom alkyl groups; or benzothiazyl, dialkylthiocarbamoyl; alkylamino of 4–12 carbon atoms; morpholino; or dialkylthiophosphoryl; $R_2$ having a valence of y; and $R_1$ is hydrogen or a radical selected from the same group as $R_2$.

8. The method of claim 7 wherein (A) is an aliphatic mercaptan of from 3–18 carbon atoms.

9. The method of claim 7 wherein (A) is a phenyl mercaptan.

10. The method of claim 7 wherein (A) is 2,2'-dithiobisbenzothiazole.

11. The method of claim 7 wherein (A) is 2-mercaptobenzothiazole.

12. The method of claim 4 wherein (B) is maleic acid.

13. The method of claim 4 wherein carbon black is present.

14. The method of claim 4 wherein the mastication time is from 0.5 to 15 minutes, the temperature is at least 160° C. and (A) and (B) are present in amounts of from 0.02–4 and 0.2–8 parts by weight, respectively, per 100 parts diene rubber by weight.

15. The method of claim 14 wherein the diene rubber comprises polyisoprene.

16. The method of claim 14 wherein the diene rubber comprises natural rubber.

17. The method of claim 14 wherein the diene rubber includes polybutadiene or styrene/butadiene rubber.

18. The method of claim 15 wherein (A) is 2,2'-dithiobisbenzothiazole.

19. The method of claim 18 wherein (B) is maleic acid.

20. The method of claim 1 wherein the time is from 1–10 minutes, the temperature is from 160° to 210° C., and (A) and (B) are present in amounts of from 0.05–0.25 and 0.25–5 parts by weight, respectively, per 100 parts diene rubber by weight.

21. The method of claim 20 wherein the diene rubber comprises cis-1,4-polyisoprene.

22. The method of claim 21 wherein (A) is sulfur.

23. The method of claim 21 wherein (A) is an organic sulfur compound capable of generating thiyl radicals.

24. The method of claim 21 wherein (A) is selected from polymeric polysulfides and compounds of the formula $(R_1S_x)_yR_2$, wherein x is an integer of 1–5, y is an integer of from 1–4, $R_2$ is a radical selected from aliphatic hydrocarbon radicals of 3–18 carbon atoms optionally containing one or more ether or ester linkages and optionally substituted by one or more nitro, amino or carboxyl groups; cycloalkyl of 3–10 carbon atoms; benzyl or phenyl optionally ring-substituted by one or more nitro, amino, carboxyl, or 1–5 carbon-atom alkyl groups; or benzothiazyl; dialkylthiocarbamoyl; alkylamino of 4–12 carbon atoms; morpholino; or dialkylthiophosphoroyl; $R_2$ having a valence of y; and $R_1$ is hydrogen or a radical selected from the same group as $R_2$.

25. The method of claim 24 wherein (A) is an aliphatic mercaptan of from 3–18 carbon atoms.

26. The method of claim 24 wherein (A) is a phenyl mercaptan.

27. The method of claim 24 wherein (A) is 2-mercaptobenzothiazole.

28. The method of claim 24 wherein (A) is 2,2'-dithiobisbenzothiazole.

29. The method of claim 21 wherein (B) is maleic acid.

30. The method of claim 20 wherein the diene rubber includes polybutadiene or styrene/butadiene rubber, (A) is 2,2'-dithiobisbenzothiazole, (B) is maleic acid, and carbon black is present.

31. The method of claim 20 wherein the diene rubber includes polybutadiene or styrene/butadiene rubber, (A) is 2,2'-dithiobisbenzothiazole, (B) is maleic acid, and a non-black filler is present.

32. The method of claim 31 wherein the non-black filler is selected from clay, talc, calcium carbonate and silica.

33. The method of claim 20 wherein the diene rubber comprises natural rubber.

34. The method of claim 20 and the additional step of incorporating from 10 to 100 parts by weight of diene rubber not present during the treatment.

35. The product of the method of claim 1.
36. The product of the method of claim 11.
37. The product of the method of claim 19.
38. The product of the method of claim 28.
39. The product of the method of claim 33.

* * * * *